United States Patent [19]

Nelson et al.

[11] 4,104,224

[45] Aug. 1, 1978

[54] PROCESS FOR PREPARING WATER-DILUTABLE, HEAT-CURING EPOXY RESIN COATING COMPOSITIONS USING ORGANIC COSOLVENTS

[75] Inventors: Robert C. Nelson, Central Valley, N.Y.; John Allister Gannon, Danbury, Conn.; Kwan Ting Shen, Lakewood, N.J.

[73] Assignee: Ciba-Geigy Corporation, Ardsley, N.Y.

[21] Appl. No.: 743,871

[22] Filed: Nov. 22, 1976

[51] Int. Cl.$^2$ .................... C08L 61/24; C08L 61/28
[52] U.S. Cl. ........................... 260/29.4 R; 260/29.3; 260/831; 260/834; 260/838; 260/849
[58] Field of Search .......... 260/29.4 R, 29.3, 29.2 EP, 260/838, 849, 834, 831

[56] References Cited

U.S. PATENT DOCUMENTS

| | | | |
|---|---|---|---|
| 2,731,444 | 1/1956 | Greenlee | 260/47 |
| 2,947,717 | 8/1960 | Belanger | 260/47 EC |
| 3,379,791 | 4/1968 | Larson et al. | 260/830 |

*Primary Examiner*—Theodore E. Pertilla
*Attorney, Agent, or Firm*—Luther A. R. Hall

[57] ABSTRACT

An improved process for preparing with the aid of organic cosolvents water-dilutable, heat-curing coating compositions comprises (a) reacting an aromatic polyglycidyl ether with a polyethylene glycol in the presence of 10 to 30% of a polyhydric phenol, (b) adding an aminoplast curing agent, and (c) diluting with water to give a stable aqueous or aqueous organic composition.

The process gives compositions which are useful in preparing coatings for a wide variety of substrates.

44 Claims, No Drawings

PROCESS FOR PREPARING WATER-DILUTABLE, HEAT-CURING EPOXY RESIN COATING COMPOSITIONS USING ORGANIC COSOLVENTS

BACKGROUND OF THE INVENTION

This invention pertains to the process for preparing water-dilutable, heat-curable coating compositions which are based on aromatic polyglycidyl ethers curable with aminoplast or phenoplast curing systems.

Water-dilutability of the aromatic polyglycidyl ether based compositions can be attained by their initial reaction with polyethylene glycol to form hydroxy-containing adducts capable of later curing with conventional aminoplast or phenoplast curing systems.

The reaction of polyhydric alcohols with epoxy resins is known. In U.S. Pat. No. 2,731,444 the reaction of epoxy resins with polyhydric alcohols is taught to give compositions suitable as crosslinking reactants. There are disclosures of the reactions of epoxy resins with less than one equivalent of hydroxyl per epoxy group, with equivalent amounts of hydroxyl to epoxy group, but with incomplete reaction thereof, and of excess hydroxyl group per epoxy group. However, this patent does not teach or suggest the process of the instant invention. In every case, the epoxy resin disclosed has a higher molecular weight than the aromatic polyglycidyl ethers found operable in the process of this invention.

Although U.S. Pat. No. 2,731,444 does disclose the use of polyethylene glycols with a broad spectrum of molecular weights below, within and above the critical limits of the process of this invention, the only exemplification results in a product which is a wax-like solid insoluble, non-dilutable by water being clearly outside the critical limits of the present process.

While U.S. Pat. No. 2,731,444 teaches that the reaction products of epoxy resins and polyhydric alcohols, including polyethylene glycol, can be further reacted with various polyfunctional crosslinking reactants through epoxy or hydroxy groups thereon and that the reaction products of epoxy resins with less than equivalent amounts of polyhydric alcohols are valuable coating compositions, it does not teach or suggest the process of this invention for the preparation of water-dilutable, heat-curable coating compositions nor does it lay down the critical limits required to achieve the instant process. In fact, U.S. Pat. No. 2,731,444 teaches away from the instant process by broadly disclosing the reaction of epoxy resins and polyhydric alcohols without suggesting that water-dilutability is possible let alone a desirable objective. In fact, none of the exemplifications in the disclosure of this reference falls within the critical limits of the instant process.

The reaction of polyethylene glycol with an aromatic diepoxide is also taught in U.S. Pat. No. 3,563,943 for the preparation of oxyethylene-containing non-ionic compounds useful as emulsifiers for urethane latices. This patent teaches that the polyethylene glycol must have a molecular weight of from about 5,000 to about 10,000 and be reacted with an aromatic diepoxide in a mole ratio of polyethylene glycol to aromatic diepoxide of at least 2:1. The non-ionic emulsifiers resulting have a molecular weight of from 12,000–24,000. While the chemical reactions described here to prepare the emulsifier are in some ways similar to those employed in this invention, a much lower (400 to 800) molecular weight range of polyethylene glycol is needed to produce a hydroxy-containing material suitable for use in water dilutable coating compositions. In addition, a mole ratio of polyethylene glycol plus dihydric phenol to poly epoxide of 1:1 to 1:2 is required in the instant process.

U.S. Pat. No. 2,951,778 teaches the use of the reaction product of poly(1,2-epoxide) with monomeric ethylene glycol at mole ratios of 2:1 to 1:2 to form a flexibilizer useful in epoxy resin formulations. Such a material would be insoluble in water and of no value in the water-dilutable process of this invention.

U.S. Pat. No. 2,947,717 teaches the use of a dihydric alcohol of molecular weight less than 600, including polyethylene glycol, in combination with a poly(1,2-epoxide) and a polycarboxylic acid anhydride for the preparation of crosslinked infusible resinous products made more fluid and hence easier to use before curing by the presence of dihydric alcohol. The various ingredients are mixed in the absence of any solvent (organic or water) and heated till homogeneous at temperatures not over 80° C. Heating at 80°–200° C effects curing and crosslinking of this system as all three components interact with one another. This system would not be water-dilutable; in fact the presence of water would render it inoperable due to premature hydrolysis of the anhydride before curing.

In U.S. Pat. No. 4,048,179, a process is described for preparing water-dilutable, heat-curable coating compositions which comprises reacting an aromatic polyglycidyl ether having a molecular weight in the range of 360 to 500 with a polyethylene glycol having an average molecular weight in the range of 400 to 800 in the presence of 0 to 20% by weight of a polyhydric phenol to form a water-dilutable, hydroxy-containing adduct; adding 5 to 50% by weight of solids of an aminoplast or phenoplast curing agent; and diluting with water to bring the total percent solids in the range of 10 to 80% by weight and to yield a stable, aqueous composition containing no particles larger in size than 0.1 micron.

In this process, the composition resides essentially in an all-aqueous medium with no organic solvent of consequence present. The chemical nature of the composition is tailored to meet the requirements for water-dilutability in an all-aqueous medium. Water-dilutability depends on the ratio of epoxy resin, to bis-phenol A to polyethylene glycol in the hydroxy-containing adduct formed in the process. For the all-aqueous medium the moles of aromatic polyglycidyl ether to combined moles of polyethylene glycol plus polyhydric phenol are in the ratio of 1.0/1.0 to 3.0/1.0, preferably 1.25/1.0 to 1.35/1.0, with the moles of polyethylene glycol to moles of polyhydric phenol in the ratio of 1.0/0.0 to 1.0/1.5.

DETAILED DISCLOSURE

This invention pertains to an improved process for preparing a water-dilutable, heat-curable coating composition which comprises (a) a hydroxy-containing adduct formed by reacting an aromatic polyglycidyl ether having a molecular weight in the range of 360 to 500 with a polyethylene glycol having an average molecular weight in the range of 400 to 800 in the presence of 10 to 30% by weight of a polyhydric phenol, (b) 5 to 50% by weight of solids of an aminoplast or phenoplast curing agent, and (c) sufficient water to bring the total percent solids in the range of 10 to 65% by weight, wherein the improvement comprises adding to the hydroxy-containing adduct either before or after addition of the curing agent (b) from 5 to 50% by weight based on the adduct (a) of an organic solvent selected from the group consisting of esters, ethers, alcohols, ketones, ether-alcohols and mixtures thereof before dilution with water (c) to give a stable, aqueous organic composition which contains no particles larger in size than 0.1 micron or which is a fine particle emulsion with particles up to 5 microns in size, and with the proviso that the weight ratio of organic solvent to water cannot exceed 1 to 3.

This invention also relates to another improved process for preparing a water-dilutable, heat-curable coating composition which comprises (a) a hydroxy-containing adduct formed by reacting an aromatic polyglycidyl ether having a molecular weight in the range of 360 to 500 with a polyethylene glycol having an average molecular weight of 400 to 800 in the presence of 10 to 30% by weight of a polyhydric phenol, (b) 5 to 50% by weight of solids of an aminoplast or phenoplast curing agent, and (c) sufficient water to bring the total percent solids in the range of 10 to 65% by weight, wherein the improvement comprises adding to the hydroxy-containing adduct (a) either before or after addition of the curing agent (b) from 25 to 100% by weight based on the adduct (a) of a volatile organic solvent having a boiling point below 160° C selected from group consisting of the aromatic hydrocarbons, esters, ethers, alcohols, ketones, halogenated aromatic hydrocarbons and mixtures thereof, diluting with sufficient water to bring the total percent solids in the range of 30 to 50% by weight, removing the volatile organic solvent by distillation to yield an essentially organic solvent-free aqueous system to which curing agent (b) if not added earlier, and further water (c) can be added to give a stable, aqueous composition containing no particles larger in size than 0.1 micron or a fine dispersion with particles of size between 0.1 and 5 microns.

A water-dilutable composition is characterized in that the hydroxy-containing adduct and the aminoplast or phenoplast curing agent are in essentially an all-aqueous medium or in an aqueous organic medium containing a limited quantity of organic solvent to abet water-dilutability. The resulting composition can be further diluted with water, if required, as contrasted to conventional coating compositions where the solid materials are dissolved in an organic solvent and further dilution with water to give uniform stable compositions suitable for preparing useful coatings is not possible.

The term "water-dilutable compositions" as used in the processes and products of this invention indicates compositions containing organic solids in an aqueous or an aqueous organic medium to which additional quantities of water may be added without agglomeration, precipitation or separation of said solids. These water-dilutable compositions may contain organic solids that are colloidally dispersed in water containing a limited volume amount (generally up to 20–30% based on the volume of water plus organic solvent) of an organic cosolvent with no particles being visible when the composition is viewed through an optical microscope. Particle sizes present in the composition do not exceed 0.1 micron in size.

These water-dilutable compositions may also contain organic solids that are present in the water-organic cosolvent medium mentioned above as a fine particle emulsion or dispersion with particles up to 5 microns in size.

Finally, these water-dilutable compositions may also contain organic solids colloidally dispersed in an essentially organic solvent-free aqueous medium with no particles larger in size than 0.1 micron or as a fine dispersion with particles of size between 0.1 and 5 microns.

In some cases the addition of a small quantity (0.05 to 0.5% by weight based on the hydroxy-containing adduct) of a water miscible organic amine or ammonia to organic solvent and hydroxy-containing adduct can convert an aqueous organic fine particle emulsion made by the first process into an aqueous organic colloidal dispersion.

The use of 0.05 to 0.5% by weight based on the hydroxy-containing adduct of a water miscible organic amine or ammonia also aids in preparing an aqueous colloidal or fine particle dispersion by the second process of this invention wherein the amine or ammonia aids in forming an aqueous organic solution or emulsion of the adduct prior to removal of the volatile organic solvent by vacuum distillation.

The water miscible organic amines useful in this invention are the lower alkyl primary, secondary and tertiary amines with 1 to 4 carbon atoms in each alkyl radical, morpholine, piperidine, pyrrolidine and the like. Typical alkyl amines useful in the processes are diethylamine, triethylamine, methylamine, dibutylmethylamine, diisopropylamine, sec-butylamine and the like.

Other water-miscible organic amines useful in these processes are the aminoalcohols such as 2-aminoethanol, 2-dimethylaminoethanol, triethanolamine, diethanolamine and the like. It is found that ammonia, triethylamine and 2-dimethylaminoethanol are particularly useful.

Another improved process of this invention also involves the preparation of water-dilutable coating compositions with the aid of limited amounts of organic solvent. However, the organic solvent is then removed by distillation to yield a solvent-free aqueous colloidal or fine dispersion which can be further diluted with the aqueous aminoplast or phenoplast curing agent and water. Thus, while during the preparation of the water-dilutable coating composition the aid of limited amounts of organic cosolvent is required, the organic solvent is removed under controlled, environmentally protective conditions before the instant coating composition is used in the field in coating operations where organic solvents released into the atmosphere are undesirable.

The advantages of such a water system are a reduction in fire hazards since flammable organic solvents are replaced by water, the lack of odors and noxious and toxic fumes to be controlled during the manufacture and subsequent use of the coating composition, and the lack of need for an expensive solvent recovery system which would be mandated by both economic and ecological reasons.

Increasing concern about environmental and health hazards, as exemplified by the California Rule 66 ban on the release of organic vapors into the atmosphere and in recent OSHA regulations on banning undue exposure of workers to potentially toxic organic vapors often encountered in conventional coating operations, points to the need for replacing organic solvents in coating compositions with water dilutable systems. The compositions of this invention provide a practical means of preparing coatings based on epoxy and aminoplast curing agents, which are known to give good coating performance, in new and desirable processes, using aqueous systems thereby circumventing the hazards to personnel and environment inherent with the conventional processes using organic solvents.

Governmental air pollution regulations, such as California Rule 66 and its newly modified version Rule 442, generally refer to amounts of organic solvents in terms of volume percents. Most present regulations limit the organic solvent portion of the liquid phase to 20% by volume, but recently 30% by volume systems are also permitted in many circumstances.

Since most organic solvents used in this invention have densities somewhat less than 1.0, a 20-30% by volume limit would by rule of thumb be equivalent approximately to 17-25% by weight of organic solvent.

The coatings prepared from the compositions made by either process of this invention are essentially comparable in physical properties, appearance, durability, clarity, toughness, adhesion, strength, impact resistance and the like to coatings prepared from conventional coating compositions in organic solvents. Surprisingly these cured coatings are also essentially as insensitive to water as coatings prepared from conventional organic solvent systems.

The organic solvents useful in the first aforementioned process wherein some organic solvent is present in the coating composition are used at the 5 to 50% by weight level based on the hydroxy-containing adduct formed. Preferably these solvents are used at the 10 to 20% by weight level.

In the second aforementioned process wherein the organic solvent is used to form first an aqueous organic solution of the adduct and then is removed by distillation, 25 to 100% by weight of organic solvent based on the hydroxy-containing adduct is used, preferably 40 to 70% by weight.

The organic solvents useful in the two processes of this invention fulfil different functions depending on the particular process involved.

The first process involves preparing water-dilutable compositions containing from 5 to 50% by weight of an organic solvent based on the hydroxy-containing adduct. This small amount of organic solvent is removed concomitantly with the water during the cure cycle of the coating. The organic solvent is used in limited quantities (generally less than 17-25% by weight based on the weight of water plus organic solvent) preferably between 5 and 10% by weight of the total composition. The function of the organic solvent is to abet the water-dilutability of the composition. Therefore, the organic solvent used should be first a solvent for the hydroxy-containing adduct and secondly either water miscible or at least sufficiently compatible with water to avoid massive separation or agglomeration of the water-dilutable composition into clearly separate phases on storage or standing. Both the water and organic cosolvent are removed from the coating compositions concomitantly during the curing cycle. Thus, the boiling point of the organic cosolvent may be relatively high (such as with butyl carbitol, 231° C) without causing difficulty. Mixtures or organic cosolvents may also be used in this process.

Examples of organic solvents useful in this invention include for illustrative purposes only:

Ethers — tetrahydrofuran, 1,2-dimethoxyethane, 1,2-diethoxyethane, diethylene glycol dimethyl ether, diethylene glycol diethyl ether;

Alcohols — methanol, ethanol, isopropanol, n-propanol, n-butanol, ethylene glycol, propylene glycol, tetrahydrofurfuryl alcohol;

Ketones — acetone, methyl ethyl ketone, diethyl ketone;

Ether — alcohols — the cellosolves such as 2-methoxyethanol, 2-ethoxyethanol, 2-n-butoxyethanol and the like, the carbitols such as methoxydiethylene glycol, ethoxydiethylene glycol, n-butoxydiethylene glycol, diethylene glycol, triethylene glycol; and Esters — ethyl acetate, n-butyl acetate.

The preferred organic cosolvents useful in this first process include the lower alkyl cellosolves such as 2-methoxyethanol, 2-ethoxyethanol and 2-n-butoxyethanol. Other preferred organic cosolvents are the lower alkyl carbitols such as methoxydiethylene glycol, ethoxydiethylene glycol and n-butoxydiethylene glycol, as well as ketones such as acetone, methyl ethyl ketone and methyl amyl ketone or esters such as ethyl acetate or butyl acetate. Mixtures of cellosolves, carbitols, ketones and/or esters are also useful in this process.

The most preferred solvents of this process are butyl cellosolve and butyl carbitol.

In the second process for preparing essentially organic solvent-free aqueous compositions, the organic solvent must first be a solvent for the hydroxy-containing adduct and secondly should be easily removed from the aqueous system by distillation under vacuum. Thus, a combination of appropriate volatility, relatively low boiling point (below 160° C) and proper azeotropic behavior with water characterize the organic solvents useful in the second process which leads to aqueous compositions essentially free of organic solvent.

Water solubility or water miscibility is not a requisite for the organic solvent to be useful in this second process. Indeed, it may be more difficult to use a water soluble organic solvent such as acetone in the second process than a solvent with more modest water solubility such as methyl ethyl ketone or a solvent with almost no water solubility such as benzene. Mixtures of organic solvents can also be used in this process.

Examples of organic solvents useful in this invention include for illustrative purposes only:

ketones — methyl ethyl ketone, methyl amyl ketone, diethyl ketone, acetone, methyl isopropyl ketone, cyclohexanone;

ethers — tetrahydrofuran, 1,2-dimethoxyethane, 1,2-diethoxyethane;

esters — ethyl acetate, n-butyl acetate;

alcohols — n-butanol, isopropanol;

aromatic hydrocarbons — benzene, toluene, xylene; and halogenated aromatic compounds — chlorobenzene.

The preferred organic solvents for the process of this invention are methyl ethyl ketone, ethyl acetate, or mixtures thereof. The most preferred solvent is methyl ethyl ketone.

It is also contemplated that the hydroxy-containing adducts of this invention may be used as integral components in other water-borne resin compositions used in the preparation of coatings, films and the like. Such resin compositions would include the hydroxyalkyl acrylic esters, hydroxy alkyds, polyesters, acrylamides, epoxy resins and the like.

The aromatic polyglycidyl ethers that can be used in this invention comprise those organic materials which have more than one terminal vic-epoxy group, i.e.,

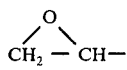

These aromatic polyglycidyl ethers are liquid polyepoxides. The polyepoxides useful in the process of this invention are derived from polyhydric phenols, preferably dihydric phenols, and may be substituted with substituents, such as chlorine, hydroxyl group, ether radicals, and the like.

The polyepoxides comprise a relatively large class of materials and have been described in numerous patents such as U.S. Pat. Nos. 2,467,171, 2,615,007, 2,716,123, 3,030,336, 3,053,855, 3,075,999 and 3,624,180. The disclosures of the various polyepoxides in said patents are incorporated herein by reference.

Epoxy polyethers are often prepared by reactions a polyhydric phenol with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4 hydroxyphenyl)propane (Bisphenol A), 2,2-bis(4-hydroxyphenyl)-butane, bis(4-hydroxyphenyl)methane(bis-phenol F), 4,4'-dihydroxybenzophenone, bis(4-hydroxyphenyl)ethane, 2,2-bis(4-hydroxyphenyl)pentane and 1,5-dihydroxynaphthalene. By varying the ratios of the phenol and epichlorohydrin one obtains different molecular weight products as shown in U.S. Pat. No. 2,633,458.

A preferred group of the above-described epoxy polyethers of polyhydric phenols are glycidyl polyethers of the dihydric phenols. These may be prepared by reacting the required proportions of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50° C. to 150° C. The heating is continued for seven hours to effect the reaction and the product is then washed free of salt and base.

The preparation of glycidyl polyethers of dihydric phenols is illustrated in U.S. Pat. Nos. 2,582,985, 2,615,007 and 2,633,458.

Polyepoxides having an average molecular weight between 360 and 400 are particularly preferred in the process of this invention.

Preferably the aminoplast curing agent is selected from the group consisting of urea-formaldehyde resins, melamine-formaldehyde resins, hexamethoxymethylmelamine and other nitrogen resin precursors. The amount of said aminoplast curing agent in the composition is 5 to 50% by weight of solids, and is preferably 15 to 40% by weight of solids.

Most preferably the aminoplast curing agent is a methylated urea-formaldehyde resin available commercially as "Beetle 65" from American Cyanamid, a methoxy methyl melamine-formaldehyde resin available commercially as "Uformite MM-83" from Rohm and Haas or a nitrogen resin precursor, hexamethoxymethylmelamine available commercially as "Cymel 303" from American Cyanamid. The amount of said aminoplast curing agent in the composition is most preferably 20 to 30% by weight of solids.

The instant compositions are water-dilutable and yield stable, uniform compositions over a wide range of aqueous system concentrations from 10 to 65% solids by weight. Preferably the percent solids concentration range is 10 to 55% by weight and most preferably 30 to 50% by weight.

The aromatic polyglycidyl ethers useful in the process of this invention are liquid epoxy resins having an average molecular weight in the range of 360 to 500 or an average epoxy equivalent weight of 180 to 250. These aromatic glycidyl ethers are prepared by the glycidylation of polyhydric phenols using epichlorohydrin and alkali. Among the dihydric phenols which may be used to prepare the aromatic polyglycidyl ethers suitable for use in the process of this invention are: 2,2-bis(4-hydroxyphenyl)propane, 2,2-bis(3-bromo-4-hydroxyphenyl)propane, 2,2-bis(3,5-dichloro-4-hydroxyphenyl)propane, 2,2-bis(3-chloro-4-hydroxyphenyl)-propane, bis(4-hydroxyphenyl)methane, bis(4-hydroxyphenyl)-sulfone, bis(4-hydroxyphenyl)sulfide, resorcinol and hydroquinone. The preferred dihydric phenols are 2,2-bis(4-hydroxyphenyl)propane (bis-phenol A) and bis(4-hydroxyphenyl)-methane (bis-phenol F). Most preferred is 2,2-bis(4-hydroxyphenyl)propane for reasons of cost and commercial availability.

While the chemical reactions between aromatic polyglycidyl ethers and polyethylene glycol are not dependent per se on the molecular weights of the two reactants, the nature of the product is definitely dependent on the molecular weights of these reactants.

Two criteria must be met by the process of this invention for operability. These are: (1) the composition prepared by the process must be water-dilutable to yield a stable, aqueous or aqueous organic system; (2) the coatings prepared from such an aqueous or aqueous organic system must be essentially equivalent in properties to epoxide coatings prepared from all organic solvent systems. That is the coatings made from the compositions of the processes of this invention must not have unacceptable flaws directly related to the use of water as the coating composition medium or to individual components in the hydroxy-containing adduct prepared in the first step of the process.

Preferably the aromatic polyglycidyl ether should have a molecular weight of about 360 to 400.

The polyethylene glycols useful in the process of this invention have an average molecular weight of 400 to 800, preferably 400 to 600, and most preferably 600. Mixtures of polyethylene glycols providing the same overall average molecular weight on a molar basis also may be used in the process of this invention. Thus, 0.5 mole of a 600 molecular weight glycol plus 0.5 mole of a 1000 molecular weight glycol is essentially equivalent to 1.0 mole of an 800 molecular weight glycol.

As was described with the aromatic polyglycidyl ethers, the molecular weight of the polyethylene glycol is important in whether the hydroxy-containing adduct or the final coating meets the criteria described above.

When polyethylene glycols of molecular weight less than 400 are used, the hydroxy-containing adducts formed by reaction with the aromatic polyglycidyl ether are not water-dilutable. The same is true when polyethylene glycols with molecular weights over 800 are used. There must be a proper balance of hydrophilicity brought to the hydroxy-containing adduct by the polyethylene glycol for the process to be operable. This balance is only achieved by the polyethylene glycols of average molecular weight in the range of 400 to 800.

The water-dilutable, hydroxy-containing adduct is prepared by reaction of an aromatic polyglycidyl ether, a polyethylene glycol and a polyhydric phenol. The preferred polyhydric phenol is 2,2-bis-(4-hydroxyphenyl)propane or bis-phenol A, which must be added as co-reactant in the amount between 10 and 30% by weight. Within the limits noted, the use of bis-phenol A has no deleterious effects on the water-dilutability of the compositions made by the process of this invention or on the properties of the cured coatings prepared from said compositions.

The use of the polyhydric phenol in the first step of the process has the very advantageous effect of catalyzing the reaction between the aromatic polyglycidyl ether and the polyethylene glycol shortening the time needed to prepare the hydroxy-containing adduct from 25 to 30 hours at 230° C. in absence of the phenolic coreactant to 8 to 12 hours at 230° C. in the presence of the phenolic coreactant.

Another important variable in the process step for preparation of the hydroxy-containing adduct is the mole ratio of the various reactants. In order to achieve water-dilutability it is necessary that the moles of aromatic polyglycidyl ether not exceed the combined moles of polyethylene glycol plus polyhydric phenol coreactant by a ratio greater than 2.0 to 1.0. At higher mole ratios of aromatic polyglycidyl ether to polyethylene glycol plus polyhydric phenol, water dilutability is simply not achievable.

On the other end of the scale, where the moles of aromatic polyglycidyl ether are less than the combined moles of polyethylene glycol plus polyhydric phenol coreactant, water-dilutability is indeed achieved, but the second important criterion, namely acceptable cured coating properties deriving from the compositions made by the process of this invention, is not met. The coatings prepared from compositions where the moles of aromatic polyglycidyl ether to the combined moles of polyethylene glycol plus polyhydric phenol are in a ratio of less than 1.0 to 1.0 are unacceptable in terms of surface properties such as tackiness, blocking and scuff resistance.

Thus, the operable ratio of moles of aromatic polyglycidyl ether to combined moles of polyethylene glycol plus polyhydric phenol is 1.0/1.0 to 2.0/1.0. The range 1.25/1.0 to 1.35/1.0 is particularly preferred.

The molar ratio of polyethylene glycol to polyhydric phenol itself is also critical in order for the process to yield water-dilutable compositions. When keeping the total moles constant, the amount of polyhydric phenol is increased with a concomitant decrease in the amount of polyethylene glycol, it was found that water-dilutability was no longer achieved if the molar ratio of polyethylene glycol to polyhydric phenol exceeded 1.0/9.0. Thus, to achieve water-dilutability the moles of polyethylene glycol to moles of polyhydric phenol in the process of this invention must be in the ratio of 1.0/1.5 to 1.0/9.0.

The first step of the process where the aromatic polyglycidyl ether is reacted with the polyethylene glycol can be carried out at a temperature in the range of 150° to 250° C, but preferably at 200° to 230° C. The reaction is carried out with good agitation under an inert atmosphere such as nitrogen or argon.

The course of the reaction is monitored by taking aliquot samples and measuring the epoxy equivalent value per 100 grams. The preferred aromatic polyglycidyl ether has an initial epoxy equivalent in the range of 0.51 to 0.54. The final epoxy equivalent values of the water-dilutable, hydroxy-containing adducts are usually in the range of 0.01 to 0.10 epoxy equivalents/100 grams, and preferably in the range of 0.03 to 0.075 epoxy equivalents/100 grams.

In the cases where 1.0 mole of aromatic polyglycidyl ether is reacted with 1.0 mole of (polyethylene glycol plus polyhydric phenol), the final epoxy equivalent value approaches zero at 100% conversion. This procedure is not preferred since there is some danger of premature gelation, presumedly by crosslinking, of the hydroxy-containing adduct.

The hydroxyl number of the hydroxy-containing adducts generally fall in the range of 2.5 to 3.5 equivalents/kilogram, and typically 3.0 equivalents/kilogram. There does not seem to be any direct correlation between the hydroxyl number, water-dilutability and final coating properties in the process of this invention.

The aromatic polyglycidyl ethers having a molecular weight in the range of 360 to 400 are available commercially as liquid epoxy resins under a variety of trademarks such as "ARALDITE" 6010 (CIBA-GEIGY), "Epon" 828 (Shell), "DER" 331 (Dow) and "Epi-Rez" 510 (Celanese).

The polyethylene glycols of average molecular weights varying from 300 to 1000 are available commercially, e.g., the "Carbowax" products of Union Carbide or as the polyethylene glycols of Dow.

The urea-formaldehyde and melamine-formaldehyde aminoplast curing agents are commercially available, e.g., respectively "Beetle 65" of American Cyanamid, "Beckamines" of Reichhold Chemicals and the "Uformite MM-83" of Rohm and Haas and "Cymel 300" of American Cyanamid. The latter is a hexamethoxymethylmelamine material largely monomeric in structure while the other materials cited are oligomeric or polymeric in nature.

Some curing agents employed in this invention are nitrogen-containing resin precursors particularly those capable of being insolubilized at acid pH values and which act as crosslinking agents under acid conditions. These are resin precursors, urea-formaldehyde type resins and the substituted cyclic triazines. Suitable groups of resin precursors include dimethylol and polymethylol derivatives of urea, N,N'-ethylene urea, N,N'-propylene urea, dihydroxyethylene urea, thiourea, dicyandiamide, guanidine, esters of carbamic acid, methylolated aminotriazines and methylolated triazines as well as their etherification products. Other useful precursors include 1,3-bis(hydroxymethyl)2-imidazolidinone or dimethylolethyleneurea, $N^2,N^4,N^6$-tris(hydroxymethyl)melamine, hexahydro-1,3,5,-tris(3'-methoxypropionyl)-s-triazine, benzoguanamine, ammeline, 4,6-diaminopyrimidine, acetoguanamine, melamine, benzyl urea, 3,5-diamino-triazole, diazine diamide and the like.

The aminoplast curing agents employed in this invention include the reaction products of an aldehyde with the nitrogen compounds listed above. The aldehydes that can be used conveniently include formaldehyde, acetaldehyde, paraformaldehyde, trioxane, crotonaldehyde, acrolein, benzaldehyde and furfural. The preferred nitrogen compounds are melamine and urea and the preferred aldehyde is formaldehyde.

These aldehyde condensation products contain methylol groups or similar alkylol groups depending on the aldehyde used. It is often desired to etherify the methylol group by reaction with a monohydric alcohol. While any monohydric alcohol can be used, the preferred alcohols are methanol, butanol, ethanol, pentanol, hexanol or octanol.

The amine-aldehyde condensation products are produced in a manner well known in the art, using acidic or basic catalysts and varying conditions of time and temperature. The aldehyde is often employed as a solution in water or alcohol and the condensation polymerization and etherification reactions may be carried out either sequentially or simultaneously. The reaction is usually effected in the usual formaldehyde:urea resins mol proportion of 1:1.5 to 1.4 and formaldehyde:melamine resins of 1:1.5 to 1.6. The aminoplast is preferably used in partially or completely etherified form. One preferred aminoplast used in this invention is hexamethoxymethyl melamine.

The aminoplast resins are blended with the hydroxy-containing materials of this invention in amounts ranging from 5 to 50 percent by weight based on the total weight of the solids.

In some cases acid catalysts, such as p-toluene sulfonic acid, cyclohexanesulfamic acid, butyl acid phosphate and phosphoric acid, can be added to blends of aminoplast or phenolplast and hydroxy-containing materials of this invention to increase the rate of the curing reaction, producing films or coatings that will cure at a lower temperature or in a shorter time. Up to 2 percent by weight of such acid catalysts based upon the total weight of the solids have been found to be advantageous in some instances. Polycat, a cyclamic acid, has proven to be particularly useful.

Coatings compositions prepared from a hydroxy-containing material of this invention with an aminoplast or phenolplast can be applied to a substrate by conventional means such as brushing, spraying, dipping and roller-coating. The coatings are cured by heating at 100° to 250° C for a time sufficient to effect a cure, such times generally being from about five minutes to about one hour.

Other curing agents which may be employed in the process of this invention are phenoplast resins which include etherified resols of phenolic resins, formaldehydephenol carboxylic acid resins and phenolic resin precursors.

The following examples are illustrative of the invention, but are not meant to limit the scope of the same in any fashion whatsoever.

EXAMPLE 1

Preparation of Hydroxy-Containing Adduct by Reaction of an Epoxy Resin, Bis-Phenol A and a Polyethylene Glycol To a four-necked, round-bottomed flask equipped with a mechanical stirrer, thermometer, reflux condenser and gas inlet tube was charged 490 grams (1.3 moles) of epoxy resin, produced from 2,2-bis(4-hydroxyphenyl)propane and epichlorohydrin and having an epoxy equivalent weight of 185 to 196 and a molecular weight of about 380, 159.6 grams (0.7 mole) of 2,2-bis(4-hydroxyphenyl)propane, bis-phenol A, and 180 grams (0.3 mole) of a polyethylene glycol having a molecular weight of about 600. The mixture was heated with stirring under nitrogen at a temperature of 230° C for a period of 9 hours until testing of aliquot samples showed the epoxy equivalent per 100 grams of material was 0.06. This compared to a value of 0.51–0.54 for the original epoxy resin. The resulting product (829.6 grams) was a viscous liquid to which was added 146 grams of butyl cellosolve to produce an 85% solids solution which was water-dilutable.

Additional hydroxy-containing adducts were prepared using the procedure of Example 1 by the reaction of an epoxy resin of Example 1, bis-phenol A and a polyethylene glycol. The reactions were generally carried out at a temperature between 215° and 230° C for a period of 9 to 32 hours. The results of these runs are given on Table I. Water-dilutability was found to depend critically on the composition of the adduct formed.

TABLE I

| Example | Moles Epoxy Resin | Moles Bis-Phenol A | Moles Polyethylene glycol (MW 600) | Weight % Bis-Phenol A in Adduct | Final Adduct Epoxy eq/100 g | Water* Dilutability |
|---|---|---|---|---|---|---|
| 1 | 1.3 | 0.7 | 0.3 | 19.3 | 0.060 | A |
| 2 | 1.3 | 0.7 | 0.3 | 19.3 | 0.053 | A |
| 3 | 1.3 | 0.5 | 0.5 | 12.6 | 0.065 | B |
| 4 | 1.3 | 0.6 | 0.4 | 15.8 | 0.064 | B |
| 5 | 1.3 | 0.8 | 0.2 | 23.0 | 0.074 | C |
| 6 | 1.3 | 0.9 | 0.1 | 27.2 | 0.070 | C |
| 7 | 2.0 | 0.6 | 0.4 | 12.1 | 0.10 | A |
| 8 | 2.0 | 0.7 | 0.3 | 14.5 | 0.079 | A |
| 9 | 2.0 | 0.8 | 0.2 | 17.1 | 0.078 | C |
| 10 | 2.0 | 0.9 | 0.1 | 20.0 | 0.098 | C |

*Water-dilutability depends on the composition of the adduct formed.

A. The addition of 5–50% by weight of an organic solvent, such as 20% by weight of butyl carbitol, is required to produce a water-dilutable colloidal dispersion of the adduct upon dilution with water.

B. The adduct formed with this composition is sufficiently hydrophilic to be directly water-dilutable without the aid of an organic solvent such as butyl cellosolve or butyl carbitol.

C. The addition of 5–50% by weight of an organic solvent, such as 15% by weight of butyl carbitol, is required to produce a fine particle emulsion of the adduct upon dilution with water.

EXAMPLE 11

Use of 2-Dimethylaminoethanol as a Modifier to Produce Water Dilutability

The adduct of Example 5 in 80% solids solution in butyl carbitol produced a fine particle emulsion when diluted with water, but when 0.1% by weight of dimethylaminoethanol was added to the butyl carbitol solution of the adduct, the solution exhibited water dilutability to yield a colloidal dispersion with no particles larger in size than 0.1 micron.

The 85% solids solution in butyl carbitol of the adduct of Example 6 containing 0.1% by weight of 2-dimethylaminoethanol still gave a fine particle emulsion on water dilution.

EXAMPLE 12

Preparation of Hydroxy-Containing Adduct by Reaction of an Epoxy Resin, Bis-phenol A and a Polyethylene Glycol In Examples 1-10, the effect of adduct composition on water-dilutability is shown.

When the composition of Example 5 is prepared with different final epoxy equivalent values per 100 grams of material, water-dilutability was also seen to depend on the epoxy equivalent values obtained.

Using the procedure of Example 1, 490 grams (1.3 moles) of epoxy resin, produced from 2,2-bis-(4-hydroxyphenyl)propane and epichlorohydrin and having an epoxy equivalent weight of 185 to 196 and a molecular weight of about 380, 182.4 grams (0.8 mole) of 2,2-bis(4-hydroxyphenyl)propane, bis-phenol A, and 120 grams (0.2 mole) of a polyethylene glycol having a molecular weight of about 600 were reacted at 215° C for 16 hours till testing of aliquot samples showed the epoxy equivalent per 100 grams of material was 0.07. This compared to a value of 0.51-0.54 for the original epoxy resin. The resulting adduct was diluted with 139 grams of butyl carbitol to give an 85% solids solution.

This solution was then diluted with 653 grams of water and stirred at ambient temperature using a laboratory stirrer. The resultant material was a fine particle emulsion with particles visible under an optical microscope.

Additional adducts were prepared using the same intermediates and quantities as in Example 12, but reaction times were extended till the epoxy equivalent values per 100 grams were as seen in Table II.

TABLE II

| Example | Final Adduct Epoxy Eq/100 grams | Cosolvent* | Results |
| --- | --- | --- | --- |
| 12 | 0.07 | butyl carbitol (15%) | water - emulsifiable |
| 13 | 0.06 | butyl carbitol (20%) | colloidal dispersion |
| 14 | 0.05 | butyl carbitol (20%) | colloidal dispersion |
| 15 | 0.04 | butyl carbitol (20%) | colloidal dispersion |

*%by weight of butyl carbitol cosolvent added to adduct.

EXAMPLE 16

Process for Preparation of Organic Solvent-Free Aqueous Colloidal Dispersions of Hydroxy-Containing Adducts When a hydroxy-containing adduct was prepared according to Examples 12-15, an alternate procedure for preparing an organic solvent-free aqueous colloidal dispersion involved dissolving the adduct in methyl ethyl ketone at the 50% by weight level.

In case of Example 12, 792 grams of methyl ethyl ketone was added to the hydroxy-containing adduct formed (792 grams). The mixture was cooled to ambient temperature and then 792 grams of deionized water containing 1.6 grams (0.2% by weight of the adduct) of 2-dimethylaminoethanol was added with stirring to the mixture over a 30-minute period. Rapid stirring was continued for 1 hour. The volatile organic solvent methyl ethyl ketone was then removed under vacuum (about 40 mm) at a temperature of 20°-30° C over a 4-hour period to give a colloidal dispersion of the hydroxy-containing adduct at the 50% solids level in water. The particle size of the dispersion was no greater than 0.1 micron and the dispersion contained less than 2% methyl ethyl ketone.

With the hydroxy-containing adducts of Examples 13-15, the same procedure was used to prepare the organic solvent-free aqueous 50% colloidal dispersions except that it was not necessary to use the 0.2% by weight of 2-dimethylaminoethanol used with the adduct of Example 12.

EXAMPLE 17

A formulation suitable for coating applications on various substrates was prepared by mixing 40 grams of 85% emulsion of the adduct of Example 12 in butyl carbitol with 5.90 grams of hexamethoxymethylmelamine with a Gardner-Holdt viscosity at 25° C of X-Z2 and an equivalent weight of 130-190, commercially available as "Cymel 303," and 0.16 grams of a catalyst, Curing Agent C (morpholine salt of p-toluenesulfonic acid, American Biosynthetics) 28.7% solids in water, in 55 grams of water. The hexamethoxymethylmelamine acts as the curing agent in the formulation with the addition of 0.4% on resin solids of the catalyst. The formulation had an initial viscosity of 46 seconds, a solids content of 39.8 percent, adduct:curing agent ratio of 85:15 and a pH of 5.5.

The formulation was thoroughly mixed by use of a commercial paint shaking machine (Red Devil Paint Shaker).

The aqueous formulation was stable at room temperature.

EXAMPLE 18

The formulation prepared according to Example 17 was applied using a No. 6 1.27 cm rod onto treated aluminum. The coated substrate was then subjected to a cure cycle of 10 minutes at 204° C by baking in a forced draft oven. The average film weight on each substrate was 12 mg/25.8 cm$^2$ (4 sq in).

The coated substrate was subjected to a number of standard tests as seen on Table III to assess the performance of the coatings applied.

The cross cut adhesion test involved scribing an "X" through the coating down to the substrate. No. 610 "Scotch" brand tape was then applied to the coating over the "X" with maximum contact. The tape was then quickly pulled from the coating with a combination tensile and peeling force. No adhesion loss was permissible.

The MEK resistance test involved determining the number of single pass rubs that a cast film coating will withstand before exposure of the substrate occurs when subjected to passage of a soft cotton cloth saturated with methyl ethyl ketone wrapped around an operator's index finger with moderate pressure across the coating surface. The values were highly subjective depending on the operator, but valuable relative data on surface integrity and coating quality were obtained.

The MEK scratch test is performed by scratching with a fingernail the coated substrate after it has been subjected to 100 MEK rubs. Results are recorded as pass or fail. Fail indicates the coating is removed from the substrate. This test gives an overall rating of film integrity.

The Wedge Bend Flexibility test is described in the ASTM as D3281-73. Results are recorded as distance in mm of failure along the panel. Lower values in mm are better. The value 35 mm recorded in this example is very acceptable.

The treated aluminum substrate was Amchem 401-45 treated 5052 aluminum.

TABLE III

| Test Method | | Treated Aluminum |
|---|---|---|
| Cured Film Appearance | Color : | Clear |
| | Tack : | Dry |
| | Wetting : | Excellent |
| Cross Cut Adhesion (CGTM 114) | | Excellent |
| MEK Resistance (Single Rubs) | | >500 |
| MEK Scratch Test | | Pass |
| Wedge Bend Flexibility ASTM D3281-73 | | 35 mm |
| Beer Pasteurization 30 Min. 71° C (In Closed Container) | Appearance : Adhesion (CGTM 114) : | No Change (Pass) Excellent |
| Water Pasteurization 30 Min. 71° C (In Closed Container) | Appearance : Adhesion (CGTM 114) : | No Change (Pass) Excellent |

EXAMPLE 19

Following the procedure of Example 17, a formulation was prepared from the organic solvent-free aqueous colloidal dispersion prepared by the process of Example 16 using the hydroxy-containing adduct of Example 13.

The formulation was applied following the procedure of Example 18 to treated aluminum. Evaluation of the coated samples is given in Table IV.

TABLE IV

| Test Method | | Treated Aluminum |
|---|---|---|
| Cured Film Appearance | Color : | Clear |
| | Tack : | Dry |
| | Wetting : | Excellent |
| Cross Cut Adhesion (CGTM 114) | | Excellent |
| MEK Resistance (Single Rubs) | | >500 |
| MEK Scratch Test | | Pass |
| Wedge Bend Flexibility ASTM D3281-73 | | 35 mm |
| Beer Pasteurization 30 Min. 71° C (In Closed Container) | Appearance : Adhesion (CGTM 114) : | No Change (Pass) Excellent |
| Water Pasteurization 30 Min. 71° C (In Closed Container) | Appearance : Adhesion (CGTM 114) : | No Change (Pass) Excellent |

EXAMPLE 20

A formulation suitable for coating applications on various substrates was prepared following the procedure of Example 17 by mixing 16.5 grams of the 85% emulsion of the adduct of Example 1 in butyl cellosolve with 1.50 grams of hexamethoxymethylmelamine ("Cymel 303"), 0.06 grams of a catalyst, Curing Agent C, 0.04 grams of a silicone flow control agent (BYK 301, comercially available from Mallinckrodt) in 17.5 grams of deionized water. The formulation had an initial viscosity of 30 seconds, a solids content of 45 percent and an adduct:curing agent ratio of 90:10 and a pH value of 5.2.

The formulation was stable at room temperature.

EXAMPLE 21

A formulation was prepared following the procedure of Example 20 by mixing 17.8 grams of the 85% emulsion of the adduct of Example 1 in butyl cellosolve with 2.55 grams of hexamethoxymethylmelamine, 0.07 grams of Curing Agent C and 0.04 grams of silicone flow control agent in 18.8 grams of deionized water. The formulation had an initial viscosity of 30 seconds, a solids content of 45 percent, and adduct:curing agent ratio of 85:15 and a pH value of 5.2.

The formulation was stable at room temperature.

EXAMPLE 22

The formulations prepared according to Examples 20 and 21 were applied using a No. 10 RDS rod onto a treated aluminum substrate. The coated aluminum was subjected to a cure cycle of 10 minutes at 204° C (400° F) by baking in a forced draft oven. The average film weight on the aluminum was 12–14 mg/25.8 cm$^2$ (4 sq in).

The coated aluminum was tested as described in Example 18.

The Dye Cure Test (wherein a 1.4% solution of technical grade Methyl Violet dye in butyl cellosolve is applied to a film for 30 seconds; the film is then wiped dry and compared to a No. 2 standard dye rating chart where values of 0 to 10 are recorded; low values are preferred) was carried out on the coated substrate.

Fuming Factor measures the solids lost during of the coating. Low values are preferred.

Evaluation of the coated aluminum samples are given in Table V.

TABLE V

| Test Method | Formulation | Example 20 | Example 21 |
|---|---|---|---|
| Cured Film Appearance | Color : | Clear | Clear |
| | Tack : | Dry | Dry |
| | Wetting : | Excellent | Excellent |
| Cross Cut Adhesion (CGTM 114) | | Excellent | Excellent |
| MEK Resistance (Single Rubs) | | >500 | >500 |
| Scratch Test | | Pass | Pass |
| Dye Cure Test | | 1 | 0–1 |
| Fuming Factor % | | — | 8.8 |
| 303 Can End Immersed 2 Min CuSO$_4$ Soln (Inside Coated) | | No change (Pass) | No Change (Pass) |
| 4 Min. Immersed | | — | Severe Overall Darkening |
| T-Bend Flexibility | | 4T | 6T |
| Wedge Bend Flexibility (ASTM D3281-73) | | 34 | 42 |
| Beer Pasteurization 30 Min. 71° C (In Closed Container) | Appearance : Adhesion : | No Change (Pass) Excellent | No Change (Pass) Excellent |
| Water Pasteurization 30 Min. 71° C (In Closed Container) | Appearance : Adhesion : | No Change (Pass) Excellent | No Change (Pass) Excellent |
| Steam Processing 90 Min. 121° C (Vapor Phase) | Appearance : Adhesion : | No Change (Pass) Excellent | No Change (Pass) Excellent |

EXAMPLE 23

The formulations of Example 20 and 21 were also coated on Bonderite 37 Treated Steel Panels using the general procedure of Example 22.

The average film thickness was 1.5 mil (0.0381 mm). The pencil hardness of both films was 5H (very good hardness). MEK resistance values for single rubs were each >500 and both films passed the MEK scratch test. Both films were dry and non-tacky.

What is claimed is:

1. An improved process for preparing a water-dilutable, heat-curable coating composition which comprises
   (a) a hydroxy-containing adduct formed by reacting an aromatic polyglycidyl ether having a molecular weight in the range of 360 to 500 with a polyethylene glycol having an average molecular weight in the range of 400 to 800 in the presence of 10 to 30% by weight of a polyhydric phenol, wherein the moles of aromatic polyglycidyl ether to combined moles of polyethylene glycol plus polyhydric phenol are in the ratio of 1.0/1.0 to 2.0/1.0, and wherein the moles of polyethylene glycol to moles of polyhydric phenol are in the ratio of 1.0/1.5 to 1.0/9.0,
   (b) 5 to 50% by weight of solids of an aminoplast or phenoplast curing agent, and
   (c) sufficient water to bring the total percent solids in the range of 10 to 65% by weight,
wherein the improvement comprises
   adding to the hydroxy-containing adduct (a) either before or after addition of the curing agent (b) from 5 to 50% by weight based on the adduct (a) of an organic solvent selected from the group consisting of tetrahydrofuran, 1,2-dimethoxyethane, 1,2-diethoxyethane, diethylene glycol dimethyl ether, diethylene glycol diethyl ether, an alkanol of 1 to 4 carbon atoms, ethylene glycol, propylene glycol, tetrahydrofurfuryl alcohol, a dialkyl ketone of 3 to 7 carbon atoms, a 2-alkoxyethanol of 1 to 4 carbon atoms in the alkoxy group, an alkoxydiethylene glycol of 1 to 4 carbon atoms in the alkoxy group, diethylene glycol, triethylene glycol, and a lower alkyl acetate, or a mixture thereof before dilution with water (c) to give a stable, aqueous organic composition which contains no particles larger in size than 0.1 micron or which is a fine particle emulsion with particles up to 5 microns in size, and with the proviso that the weight ratio of organic solvent to water cannot exceed 1 to 3.

2. A process according to claim 1 wherein the aromatic polyglycidyl ether has a molecular weight in the range of 360 to 400,
   the polyethylene glycol has an average molecular weight in the range of 400 to 600, and
   the amount of polyhydric phenol is 10 to 30% by weight.

3. A process according to claim 1 wherein the polyethylene glycol has an average molecular weight of 600.

4. A process according to claim 1 wherein the moles of aromatic polyglycidyl ether to combined moles of polyethylene glycol plus polyhydric phenol are in the ratio of 1.25/1.0 to 1.35/1.0.

5. A process according to claim 1 wherein the total percent solids are in the range of 10 to 55% by weight.

6. A process according to claim 1 wherein the total percent solids are in the range of 30 to 50% by weight.

7. A process according to claim 1 wherein the aminoplast curing agent is present in the amount of 15 to 40% by weight of solids.

8. A process according to claim 1 wherein the aminoplast curing agent is present in the amount of 20 to 30% by weight of solids.

9. A process according to claim 1 wherein the aminoplast curing agent is a methylated urea-formaldehyde resin.

10. A process according to claim 1 wherein the aminoplast curing agent is a methoxy methyl melamineformaldehyde resin.

11. A process according to claim 1 wherein the aminoplast curing agent is hexamethoxymethylmelamine.

12. A process according to claim 1 wherein the aromatic polyglycidyl ether is derived from 2,2-bis(4-hyroxyphenyl)propane or bis(4-hydroxyphenyl)methane.

13. A process according to claim 1 wherein the aromatic polyglycidyl ether is derived from 2,2-bis(4-hydroxyphenyl)propane.

14. A process according to claim 1 wherein the reaction of the aromatic polyglycidyl ether and polyethylene glycol in the presence of 10 to 30% by weight a polyhydric phenol is carried out at a temperature of 150° to 250° C.

15. A process according to claim 14 wherein the reaction is carried out at a temperature of 200° to 230° C.

16. A process according to claim 1 wherein the water-dilutable, hydroxy-containing adduct has an epoxy value of between 0.01 to 0.10 equivalents/100 grams.

17. A process according to claim 1 wherein the water-dilutable, hydroxy-containing adduct has an epoxy value of between 0.03 to 0.075 equivalents/100 grams.

18. A water-dilutable, heat-curing coating composition consisting essentially of the product obtained according to the process of claim 1.

19. A process according to claim 1 wherein 10 to 20% by weight of an organic solvent is added to the hydroxy-containing adduct (a).

20. A process according to claim 1 wherein 0.05 to 0.5% by weight of a water-miscible organic amine or ammonia based on the adduct (a) is added to the adduct and organic solvent to aid in converting an aqueous organic fine particle emulsion into an aqueous organic colloidal dispersion.

21. A process according to claim 1 wherein the organic solvent is selected from the group consisting of a 2-alkoxyethanol of 1 to 4 carbon atoms in the alkoxy group, an alkoxydiethylene glycol of 1 to 4 carbon atoms in the alkoxy group, a dialkyl ketone of 3 to 7 carbon atoms and a lower alkyl acetate, or a mixture thereof.

22. A process according to claim 21 wherein the organic solvent is 2-n-butoxyethanol or n-butoxydiethylene glycol.

23. An improved process for preparing a water-dilutable, heat-curable coating composition which comprises (a) a hydroxy-containing adduct formed by reacting an aromatic polyglycidyl ether having a molecular weight in the range of 360 to 500 with a polyethylene glycol having an average molecular weight of 400 to 800 in the presence of 10 to 30% by weight of a polyhydric phenol, wherein the moles of aromatic polyglycidyl ether to combined moles of polyethylene glycol plus polyhydric phenol are in the ratio of 1.0/1.0 to 2.0/1.0, and wherein the moles of polyethylene glycol to moles of polyhydric phenol are in the ratio of 1.0/1.5 to 1.0/9.0, (b) 5 to 50% by weight of solids of an aminoplast or phenoplast curing agent, and (c) sufficient water to bring the total percent solids in the range of 10 to 65% by weight, wherein the improvement comprises
   adding to the hydroxy-containing adduct (a) either before or after addition of curing agent (b) from 25 to 100% by weight based on the adduct (a) of a volatile organic solvent having a boiling point below 160° C selected from the group consisting of benzene, toluene, xylene, a lower alkyl acetate, tetrahydrofuran, 1,2-dimethoxyethane, 1,2-diethoxyethane, isopropanol, n-butanol, a dialkyl ketone of 3 to 7 carbon atoms, cyclohexanone and chlorobenzene, or a mixture thereof, diluting with sufficient water to bring the total percent solids in the range of 30 to 50% by weight, and removing the volatile organic solvent by distillation to yield an essentially organic solvent-free aqueous system to which curing agent (b), if not added earlier, and further water (c) can be added to give a stable, aqueous composition containing no particles larger in size than 0.1 micron or a fine particle dispersion of particles of size between 0.1 and 5 microns.

24. A process according to claim 23 wherein the aromatic polyglycidyl ether has a molecular weight in the range of 360 to 400,
the polyethylene glycol has an average molecular weight in the range of 400 to 600, and
the amount of polyhydric phenol is 10 to 30% by weight.

25. A process according to claim 23 wherein the polyethylene glycol has an average molecular weight of 600.

26. A process according to claim 23 wherein the moles of aromatic polyglycidyl ether to combined moles of polyethylene glycol plus polyhydric phenol are in the ratio of 1.25/1.0 to 1.35/1.0.

27. A process according to claim 23 wherein the total percent solids are in the range of 10 to 55% by weight.

28. A process according to claim 23 wherein the total percent solids are in the range of 30 to 50% by weight.

29. A process according to claim 23 wherein the aminoplast curing agent is present in the amount of 15 to 40% by weight of solids.

30. A process according to claim 23 wherein the aminoplast curing agent is present in the amount of 20 to 30% by weight of solids.

31. A process according to claim 23 wherein the aminoplast curing agent is a methylated urea-formaldehyde resin.

32. A process according to claim 23 wherein the aminoplast curing agent is a methoxy methyl melamine-formaldehyde resin.

33. A process according to claim 23 wherein the aminoplast curing agent is hexamethoxymethylmelamine.

34. A process according to claim 23 wherein the aromatic polyglycidyl ether is derived from 2,2-bis(4-hydroxyphenyl)propane or bis(4-hydroxyphenyl)methane.

35. A process according to claim 23 wherein the aromatic polyglycidyl ether is derived from 2,2-bis(4-hydroxyphenyl)propane.

36. A process according to claim 23 wherein the reaction of the aromatic polyglycidyl ether and polyethylene glycol in the presence of 10 to 30% by weight a polyhydric phenol is carried out at a temperature of 150° to 250° C.

37. A process according to claim 36 wherein the reaction is carried out at a temperature of 200° to 230° C.

38. A process according to claim 23 wherein the water-dilutable, hydroxy-containing adduct has an epoxy value of between 0.01 to 0.10 equivalents/100 grams.

39. A process according to claim 23 wherein the water-dilutable, hydroxy-containing adduct has an epoxy value of between 0.03 to 0.075 equivalents/100 grams.

40. A water-dilutable, heat curing coating composition consisting essentially of the product obtained according to the process of claim 23.

41. A process according to claim 23 wherein 40 to 70% by weight of a water-miscible organic solvent is added to the hydroxy-containing adduct (a).

42. A process according to claim 23 wherein the organic solvent is selected from the group consisting of methyl ethyl ketone and tetrahydrofuran.

43. A process according to claim 23 wherein 0.05 to 0.5% by weight of a water miscible organic amine or ammonia based on adduct (a) is added to the aqueous organic dispersion of the adduct before removal of the volatile organic solvent by distillation.

44. A process according to claim 23 wherein the organic solvent is methyl ethyl ketone.

* * * * *